(12) United States Patent
Pellaud et al.

(10) Patent No.: US 10,486,953 B2
(45) Date of Patent: Nov. 26, 2019

(54) BEVERAGE DISPENSER

(71) Applicant: Anheuser-Busch InBev S.A., Brussels (BE)

(72) Inventors: Jerome Pellaud, New Rochelle, NY (US); Daniel Peirsman, Leuven (BE)

(73) Assignee: Anheuser-Busch InBev S.A., Brussels (BE)

( * ) Notice: Subject to any disclaimer, the term of this patent is extended or adjusted under 35 U.S.C. 154(b) by 54 days.

(21) Appl. No.: 15/514,475

(22) PCT Filed: Sep. 25, 2015

(86) PCT No.: PCT/EP2015/072136
§ 371 (c)(1),
(2) Date: Mar. 24, 2017

(87) PCT Pub. No.: WO2016/046380
PCT Pub. Date: Mar. 31, 2016

(65) Prior Publication Data
US 2017/0240400 A1    Aug. 24, 2017

(30) Foreign Application Priority Data

Sep. 26, 2014    (EP) .................................... 14186708

(51) Int. Cl.
*B67D 1/00*    (2006.01)
*A47J 31/00*    (2006.01)
*B67D 1/12*    (2006.01)

(52) U.S. Cl.
CPC ............ *B67D 1/0021* (2013.01); *A47J 31/00* (2013.01); *B67D 1/0034* (2013.01);
(Continued)

(58) Field of Classification Search
CPC .... B65D 35/36; B65D 1/0034; B65D 1/0058; B65D 1/0895; B65D 1/0857;
(Continued)

(56) References Cited

U.S. PATENT DOCUMENTS 3,215,312 A    11/1965    Guzzi
4,708,266 A    11/1987    Rudick
(Continued)

FOREIGN PATENT DOCUMENTS

DE    37 09 155    10/1987
EP    1 120 377    8/2001
(Continued)

*Primary Examiner* — Reginald Alexander
(74) *Attorney, Agent, or Firm* — Levy & Grandinetti

(57) ABSTRACT

A beverage dispenser has a housing in which a first liquid inlet is connectable to a base liquid source. The housing also contains a second liquid inlet connectable to a base liquid source or to a pressurized gas source and a pair of jet mixers. First and second liquid lines connect the respective first and second liquid inlets and jet mixers. A first ingredient container contains a first beverage ingredient, the pod or capsule provided in a first ingredient container receiving means, and a second ingredient container containing a second beverage ingredient, the ingredient container provided in a second ingredient container receiving means. The first and second ingredient containers are configured such that upon providing a liquid stream in the respective liquid lines, the beverage ingredient is discharged from the ingredient container into the liquid stream. A beverage outlet is in liquid communication with the jet mixer.

8 Claims, 2 Drawing Sheets

(52) U.S. Cl.
CPC ......... *B67D 1/0052* (2013.01); *B67D 1/0078* (2013.01); *B67D 1/0079* (2013.01); *B67D 1/127* (2013.01)

(58) Field of Classification Search
CPC ...... B65D 35/242; A47J 31/00; B67D 1/0034; B67D 1/0058; B67D 1/0895; B67D 1/0857; B67D 1/0052
USPC ....... 99/279, 275, 287; 222/129.1, 132, 459, 222/325, 129.4, 145.5, 145.6
See application file for complete search history.

(56) References Cited

U.S. PATENT DOCUMENTS

| | | |
|---|---|---|
| 2007/0205220 A1 | 9/2007 | Rudick et al. |
| 2013/0062366 A1* | 3/2013 | Tansey .................. A47J 31/44 222/102 |
| 2013/0256333 A1* | 10/2013 | Doelman ............. B67D 1/0082 222/1 |
| 2014/0154368 A1 | 6/2014 | Kolls et al. |
| 2015/0166319 A1* | 6/2015 | Kaneko ................. B67D 1/005 222/129.1 |
| 2016/0318746 A1* | 11/2016 | Peirsman ............. B01F 5/0256 |

FOREIGN PATENT DOCUMENTS

| | | |
|---|---|---|
| EP | 1 538 124 | 6/2005 |
| JP | 2007-513019 | 5/2007 |
| JP | 2009-511143 | 3/2009 |
| WO | WO 2005/054116 | 6/2005 |
| WO | WO 2007/042415 | 4/2007 |

* cited by examiner

BEVERAGE DISPENSER

The present invention relates to a beverage dispensing device for dispensing different types of beverages or beverage components, wherein at least one of the beverage ingredients is provided in a unit dose as a pod or capsule.

In particular, the present invention relates to a beverage dispenser which allows the mixing of one or more beverage components and at least one carbonated liquid into a final beverage.

Without limiting the invention to the following examples, the beverage dispenser can for example be of a type wherein two beverage ingredients or a beverage ingredient and carbonated liquid are mixed with one another in a fixed ratio.

A lot of beverage dispensers are known according to the state of the art for dispensing beverages, such as for example coffee, tea or any soft drink and so on.

In these known dispensers there is sometimes also a mixing of certain liquid beverage ingredients with one another, such as for example water and milk or cream, as well as a mixing of the liquid beverage ingredients with certain additives, typically powdered or granular additives, such as for example coffee powder, sugar, all kinds of flavours and so on.

For mixing different beverage ingredients and additives the known beverage dispensers of the mentioned type are often not equipped at all with mixing means, the mixing being simply obtained by the flow of liquid beverage components into a container or receptacle under gravity or under pressure obtained from a certain liquid line or liquid vessel.

In some other known beverage dispensers mixing means are used for increasing the quality of the mixture to be obtained and more in particular for increasing its uniformity.

The mixing means are mostly of an electro-mechanical type, such as a blade or propeller provided in a receptacle, which is driven and rotated by an electric motor and which is intended for stirring or agitating the mixture of beverage ingredients and additives provided in the receptacle.

It is sure that these known beverage dispensers do their job quite well in the applications for which they have been designed.

Nevertheless, for a new type of applications of supplying beverages, which are nowadays not yet common practice, but for which there is a lot of commercial potential according to marketing studies, the known beverage dispensers are not suitable.

Such a new type of application is for example the mixing of a liquid beverage component, such as a certain beer or beer concentrate with for example one or more of the following:

one or more other beers or beer concentrates;
a fruit juice or concentrate;
a vegetable juice or concentrate;
a syrup;
carbonated water;
a carbonated soft drink;
a strong alcohol;
a coffee;
a tea;
a plant extract;
and so on.

It is clear that a beverage component such as for example a beer or beer concentrate must be treated with a lot of care in general and certainly during mixing and/or after mixing with other beverage components and/or with a carbonated liquid.

Indeed, stirring or agitating a mixture comprising a beer or beer concentrate in an open receptacle which is exposed to the air risks to cause a change of the taste of the beer for all kinds of reasons, and it can result in a non-desired premature foaming of the beer at the surface as well.

Furthermore, it is known that for beer consumers the beer head is a very important aspect of the beer when it is served, determining its aesthetic look, its aroma and taste, as well as the feeling it causes in the mouth when consumed.

From a chemical point of view is beer foam a product composed of multiple polypeptides having each a different hydrophobicity, which hydrophobicity determines the stability of the beer foam.

Also the content of carbon dioxide and/or nitrogen in a beer is an important parameter that influences the foam formation.

The content of carbon dioxide and/or nitrogen in a mixture obtained from fore-mentioned beverage components, carbonated liquids and/or diluents, comprising a beer or beer concentrate, is usually drastically modified compared to the content of carbon dioxide and/or nitrogen in the separate original beverage components.

As a consequence, also the foaming capacity of the mixture is completely different from the foaming capacity of the original beverage components.

Dependent on the particular case, this foaming capacity is decreased or increased.

In order to obtain the desired beer head, in some cases the foaming of the mixed beverage components and the carbonated liquid needs to be limited, while in other cases this foaming should be stimulated on the other hand.

Known beverage dispensers do not possess suitable mixing means by which the foaming can be controlled.

One also understands that a high quality final beverage can only be obtained by mixing beverage components, such as beer or beer concentrates, and a carbonated liquid, if the composition of the mixture is precisely chosen and in reality composed as such.

Known beverage dispensers lack often the needed precision for mixing certain quantities and types of beverage components and carbonated liquid.

Certain beverage components are difficult to mix and require thoroughly mixing if a smooth, homogeneous mixture is to be obtained, which requires improved mixing means, and especially in such cases wherein direct contact with air should be avoided, as is often the case with foaming beverage components.

A factor that is also very important in some cases is the mixing time needed for realizing a good quality mixture of homogeneous structure.

In many cases, especially in beverage dispensers intended for dispensing a wide variety of different beverages it is preferred that the mixing of beverage components and carbonated liquid is realized almost instantaneously.

Again with the known beverage dispensers this cannot be realized for many combinations of beverage components, since the mixing means are not sufficiently efficient for mixing those beverage components. It is therefore an objective of this invention to overcome one or more of the above-mentioned drawbacks or possibly other non-mentioned drawbacks of the known beverage dispensers.

In particular, it is an objective of the present invention to provide a beverage dispenser with improved mixing capacity, which allows for the mixing of beverage components which are not always easily mixed, such as foaming beverage components and this in a highly efficient, so to say instantaneously manner.

It is another objective of the present invention to provide a beverage dispenser with improved mixing capacity by which foaming of beverage components during the mixing can be controlled.

It is furthermore an objective of the present invention to provide a beverage dispenser in which many different beverage components and one or more carbonated liquids can be mixed into a wide variety of mixtures with a very high precision and without or with a much reduced contamination of the final beverage obtained.

To this aim, the invention proposes, a beverage dispenser which comprises a housing comprising:

a) a first liquid inlet connected or connectable to a source of a base liquid;
b) a second liquid inlet connected or connectable to a source of a base liquid or to a source of pressurized gas;
c) at least one mixing means for mixing one or more beverage ingredients therein;
d) a first liquid line connecting the first liquid inlet and the mixing means;
e) a second liquid line connecting the second liquid inlet and the mixing means;
f) a first ingredient container containing a first beverage ingredient, the ingredient container provided in a first ingredient container receiving means, configured such that upon providing a liquid stream in the first liquid line, the first beverage ingredient is discharged from the ingredient container into the liquid stream;
g) a second ingredient container containing a second beverage ingredient, the ingredient container provided in a second ingredient container receiving means, configured such that upon providing a liquid stream in the second liquid line, the second beverage ingredient is discharged from the ingredient container into the liquid stream;
h) a beverage outlet in liquid communication with the mixing chamber. characterized in that said mixing means comprises one or more double jet mixers, comprising each at least a first jet mixer liquid supply entry in liquid communication with the first liquid line and a second jet mixer liquid supply entry in liquid communication with the second liquid line, a pair of jet mixer liquid flow channels having each a jet mixer discharge end for expelling liquids in mutually, oppositely directed or impinging jet streams, so to mix the liquids into a liquid mixture, and a jet mixer outlet through which the liquid mixture can leave the double jet mixer in liquid communication with the beverage outlet.

A big advantage of a beverage dispenser in accordance with the invention is that it comprises at least one double jet mixer.

In such an double jet mixer a very thorough mixing of the concerned beverage components with one another or with a carbonated liquid can be obtained in a very short time, while ensuring a high quality, i.e. homogeneity and smoothness, of the mixture.

Hereby, the mixing in the double jet mixer can take place in a very confined space and there is no need to expose the mixture to air or the like, which can be an important factor for avoiding premature foaming of the mixed beverage components or carbonated liquid.

On the other hand, by adapting the design or operational conditions of the double jet mixer it is also possible to use it on the contrary as a means for creating foam under controlled circumstances.

Such an adaptation of the design of the double jet mixer can for example be a change of the double jet mixer dimensions, such as the diameters of the jet mixer liquid flow cannels, the shape of the jet mixer discharge ends or the jet mixer outlet and so on.

Changing the nominal working point in the double jet mixer can usually be realized in a more dynamic way, for example by choking the liquid flow in the jet mixer liquid flow channels by means of a control valve and so on.

Also the angle between the directions in which the jet mixer discharge ends expel a liquid can be modified in order to change the characteristics of the double jet mixer.

In a preferred embodiment this angle can be 180° and the liquids are expelled in opposite directions so that the concerned double jet mixer is actually an opposed jet mixer.

In other embodiments this angle can deviate from 180° and the liquids expelled by the double jet mixer form impinging jet streams.

It is clear that such a beverage dispenser according to the invention opens a wide range of new possibilities, in particular for creating mixtures comprising one or more beers or beer concentrates.

According to a preferred embodiment, the mixing means of the beverage dispenser comprise a housing with a wall defining a mixing chamber, the first and second liquid supply entry and jet mixer flow lines are provided with the first and second jet mixer discharge ends provided at opposite sides of the mixing chamber and directed towards one another in the mixing chamber.

More preferably the mixing means are removably secured in the beverage dispenser, in which case it is preferred that the mixing means are manufactured in a plastic material.

The housing of the mixing means may comprises two ingredient container receiving docks, while the ingredient containers comprise connectors configured to mate with one of the receiving docks of the housing of the mixing means, whereby the pods comprise a discharge channel that upon connection of the ingredient containers with the housing of the mixing means liquidly connect to the corresponding liquid supply entry of the mixing means.

An advantage of the above preferred embodiment is that the part of the dispenser device contacting the ingredients or liquid streams in the device during and after mixing can be made disposable. This is particularly advantageous for dispensing malt-based beverages or beer that are keen to contamination when a dispensing device is insufficiently cleaned. By replacing the mixing means after each dispense cycle or at a regular basis, high hygienic standards can be met and beer quality can be guaranteed.

The present invention also relates to an ingredient container comprising an outer wall defining a ingredient chamber wherein a unit dose of a beverage ingredient is contained, characterized in that said chamber is pressurized to a level of 0.5 to 2 bar overpressure and comprises a amount of compressed gas in addition to the beverage ingredient provided therein.

The advantages of such a method are of course completely equivalent to the above-mentioned advantages described with respect to a beverage dispenser in accordance with the invention.

With the intention of better showing the characteristics of the invention, hereafter, as example without any limitative character, some embodiments of beverage dispensers according to the invention and methods according to the invention for mixing one or more beverage components with at least one carbonated liquid are described, with reference to the accompanying drawings, wherein.

Figure 1:
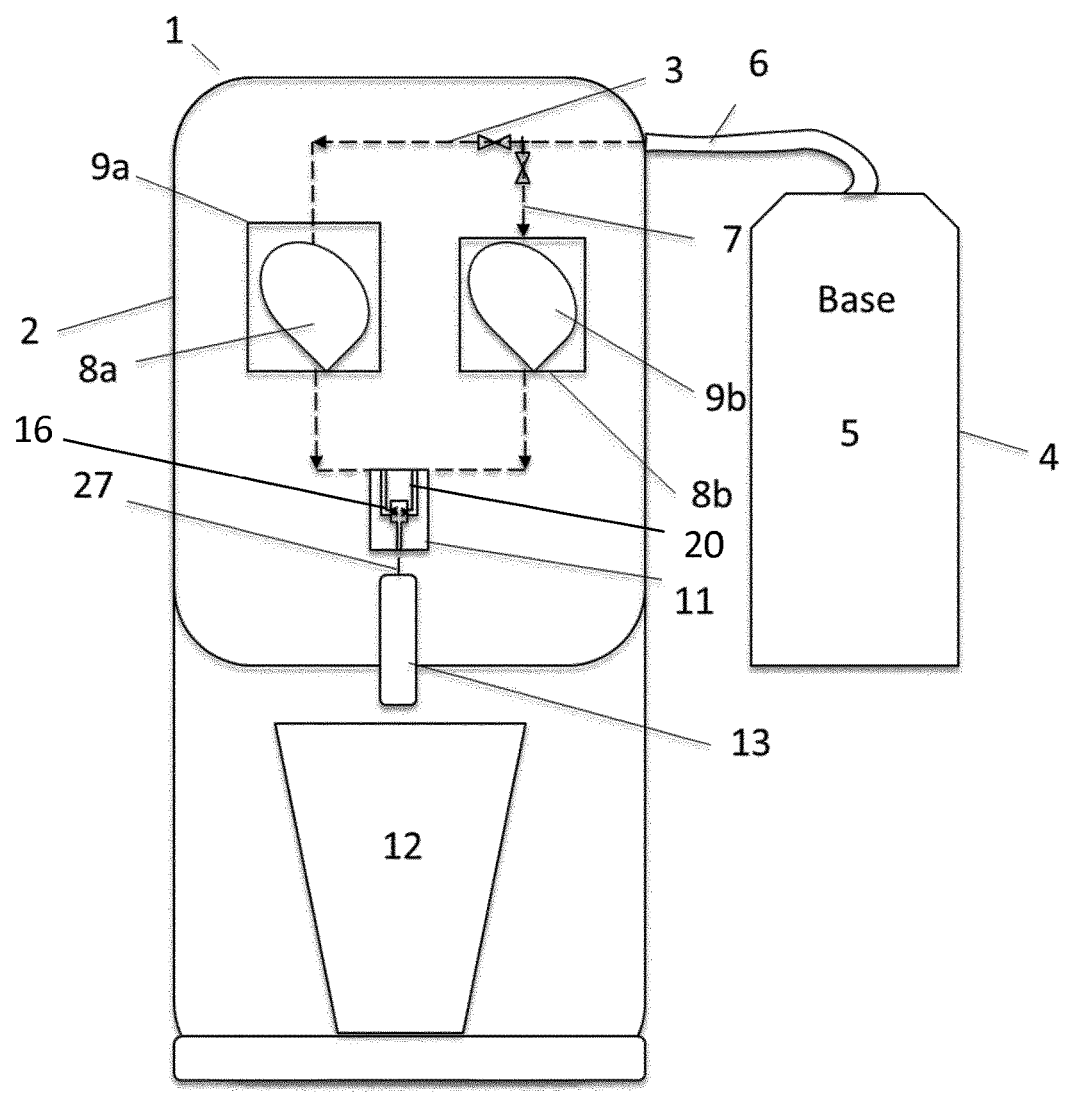
FIG. 1 is a schematic illustration of a first embodiment of a beverage dispenser in accordance with the present invention for mixing a base liquid with two or more beverage ingredients.

The first embodiment of a beverage dispenser 1 according to the invention, illustrated in FIG. 1, is a beverage dispenser of the type addressed as a home appliance, which is typically designed for home use to dispense one beverage per dispense cycle and which is configured as a table top appliance meaning it has a restricted height of about maximum 50 cm and a areal footprint of about maximum 2500 $cm^2$.

The beverage dispenser comprises a housing 2 comprising a base liquid inlet 3 which is connected to a source 4 of a first base liquid 5.

The dispenser beverage inlet 3 can for example be a pipe fitting which is suitable for connecting a source 4 to the beverage dispenser 1 or it can just be the inlet of a pipe or flexible tube used for flow of the base liquid 5 away from the source 4.

The base liquid 5 can be any product that could be used for composing a beverage, such as for example a juice, a soft drink, a beer, a pasteurized beer, a beer concentrate, a cider based beverage, cider, a strong alcohol, milk, cream, coffee, tea or even a diluent such as water and so on.

Depending on the type of the base liquid 5, the source 4 from which the base liquid 5 is supplied and in which the base liquid 5 is contained, can be for example a container, a plastic bag, a bottle, a keg or cask and so on.

The source 4 can be a pressurized vessel, containing a pressurized gas for driving the base liquid 5 out of the vessel.

In other cases the source 4 can comprise pumping means or separate gas bottles for that purpose, or the base liquid 5 can for example just leave the source 4 under the influence of gravity.

It is clear that all kinds of other commonly used elements, such as valves, switches, detectors, electronic or not electronic controller equipment in general are not represented in the drawings.

The source 4 is in this case connected to the inlet 3 by means of a liquid line 6, formed for example by a flexible or rigid tube or pipe 6.

The beverage dispenser 1 of FIG. 1 is furthermore provided with another base liquid inlet 7, which is in this case connected to a source of a second base liquid.

The second base liquid can be any product that could be used for composing a beverage, such as for example a juice, a soft drink, a beer, a pasteurized beer, a beer concentrate, a cider based beverage or cider, a strong alcohol, milk, cream, coffee, tea or even a diluent such as water and so on.

The first and second base liquid can be either different or the same.

It is clear that both the first and second liquid inlet 3, 7 can be connected to the same base liquid, in which case both inlets 3, 7 can be coupled to one single liquid line coupled to the base liquid source and splitting downstream of the coupling to the base liquid source into two side lines connected to or unitary with both inlets 3, 7.

Comprised in the housing of the beverage dispenser are a first liquid line extending from the first liquid inlet to a mixing means and a second liquid line extending from the second liquid inlet to said mixing means.

The beverage dispenser further comprises at least two ingredient containers receiving means 8a, 8b for receiving two ingredient containers 9a, 9b comprising a unit dose of a beverage ingredient to be mixed with the base liquid(s) for obtaining a desired beverage.

The ingredient containers comprise exactly one unit dose of beverage ingredient and are therefore suited for preparing exactly one beverage allowing maximal flexibility to customize a beverage to be dispensed. The ingredient containers are preferably of the kind generally addressed as pods or capsules and will be referred to as such in the description below.

At least one of the pods or capsules preferably comprises at least one of: hop concentrates, fruit concentrates, sweeteners, bittering additives, concentrated spices, foaming promoters, concentrated malt-based liquids, concentrated fermented liquids, concentrated beer, colorants and or mixtures thereof.

A first pod or capsule receiving means is configured such that the content of the pod or capsule provided therein is discharged in the first liquid line when base liquid is flowing there through, creating a first ingredient stream.

The second pod or capsule receiving means is configured such that the content of the pod or capsule provided therein is discharged in the second liquid line when base liquid is flowing there through, creating a second ingredient stream.

In this case the pod or capsule is of a flow through type, comprising a wall defining an ingredient chamber and wherein a liquid inlet and ingredient discharge are provided, whereby the first and second liquid line are both comprised of two sections, one extending from the base liquid inlet to the inlet of the corresponding pod or capsule and one extending from the ingredient discharge of the corresponding pod or capsule to the mixing means.

It is clear that the pods liquid inlets and ingredient discharges are preferably closed by valves that are actuated to an open position upon applying the pods or capsules in the dispenser pod or capsule receiving means. Such actuating mechanism is well known in the art and not described in further detail below.

The beverage dispenser 1 furthermore comprises a mixing means 11 for mixing the first and second ingredient streams into a final beverage 12.

This final beverage 12 is dispensed through a beverage outlet 13.

According to the invention the mixing means 11 comprise at least one double jet mixer 16, as is the case in the embodiment of FIG. 1.

The double jet mixer 16 comprises a first jet mixer liquid supply entry 17 and a second jet mixer liquid supply entry 18 as well as a pair of corresponding jet mixer liquid flow channels, respectively jet mixer liquid flow channel 19 and jet mixer liquid flow channel 20.

In the represented figures, these jet mixer liquid flow channels 19 and 20 are at least partly coaxial and have each a jet mixer discharge end, respectively jet mixer discharge end 21 and jet mixer discharge end 22, configured in such a way that liquids expelled from the jet mixer discharge ends 21 and 22 form mutually, oppositely directed jet streams 23 and 24 respectively.

In that way the jet streams 23 and 24 impinge on one another, so to mix the concerned liquids into a liquid mixture, an emulsion or foam.

In other embodiments the jet streams 23 and 24 are not necessarily directed in exactly opposite directions, but they could impinge on one another under another angle as well.

The double jet mixer 16 is furthermore provided with a jet mixer outlet 25 through which the liquid mixture, foam or emulsion can leave the double jet mixer 16.

The jet mixer outlet 25 is connected to the beverage outlet 13 by means of a liquid line 26, but it could form directly the beverage outlet 13 without intermediate liquid line 26.

In the embodiment of FIG. 1 the base liquid inlet 3 is furthermore connected to the first jet mixer liquid supply entry 17 of the double jet mixer 16 by means of a liquid line 27, wherein the content of the first pod or capsule is discharged to obtain the first ingredient stream.

In the embodiment of FIG. 1 the second base liquid inlet 7 is connected to the second jet mixer liquid supply entry 20 of the double jet mixer 16 by means of a liquid line, so to enable the mixing the second ingredient stream of the second base liquid and the second beverage ingredient contained in the second pod or capsule 9 by means of the double jet mixer 16.

As represented in FIG. 1, the mixing means comprise a housing with a wall defining a mixing chamber, the first and second liquid supply entry and jet mixer flow lines are provided with the first and second jet mixer discharge ends provided at opposite sides of the mixing chamber and directed towards one another in the mixing chamber.

The mixing means and in particular the housing of the mixing means are preferably removable from the housing of the dispenser to allow replacing the mixing means.

The mixing means as such can be manufactured in a variety of materials but are preferably manufactured in a plastic material such as PE or PP, rendering the mixing means easily disposable when removable from the housing.

Figure 2:
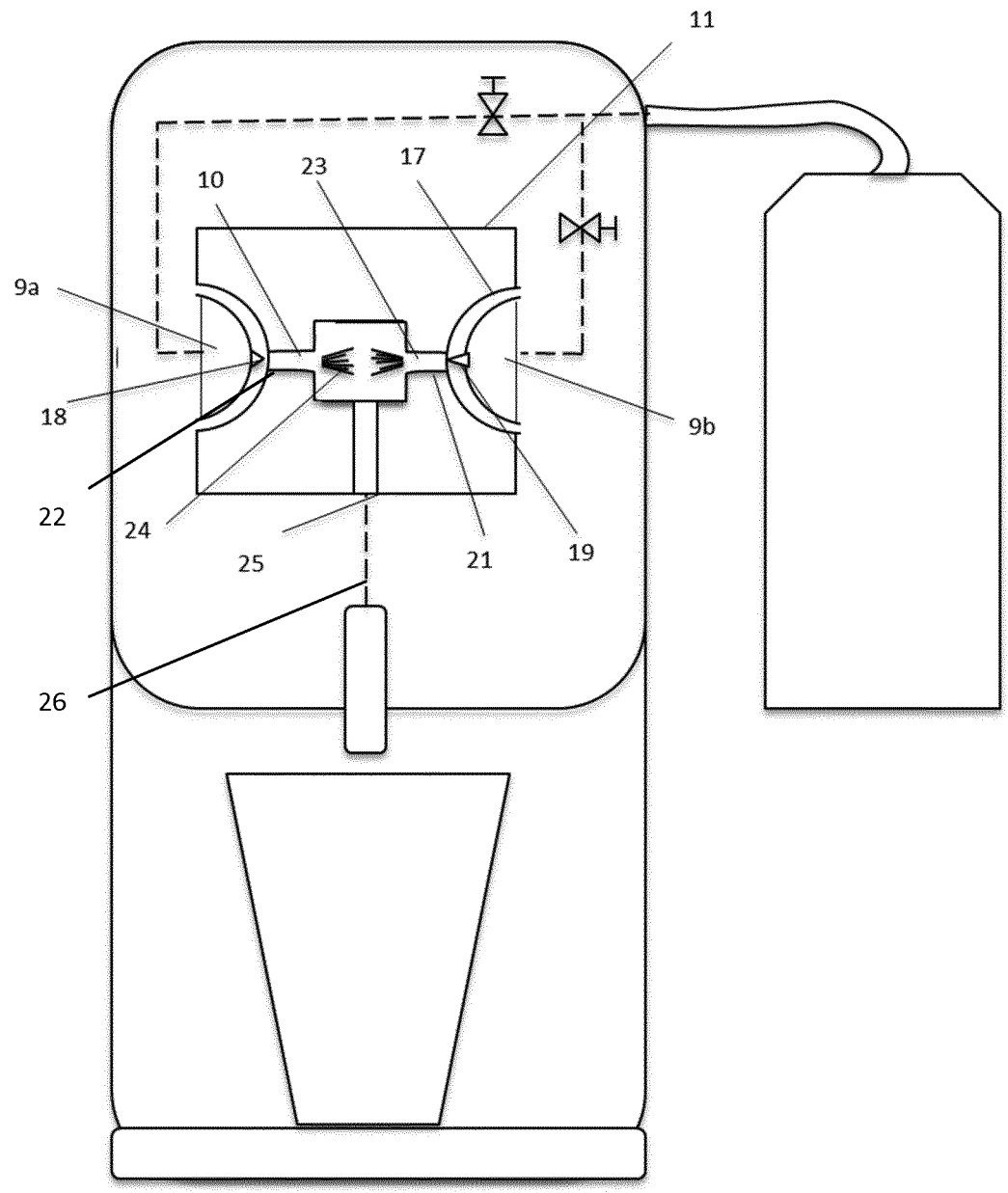
FIG. 2 is a schematic illustration of an alternative embodiment of a beverage dispenser according to the present invention.

In FIG. 2 an alternative embodiment is represented wherein the pods are directly connected to the mixing means without the need for an intermediate liquid line.

In this embodiment the mixing means is configured as a removable and disposable part of the dispenser that can be fitted in an appropriate slot in the dispenser together with the pods or capsules. To that end the housing of the mixing means comprises two receiving docks and the pods or capsules comprise connectors configured to mate with one of the receiving docks of the housing of the mixing means. The advantage of this embodiment is that all parts of the dispenser contacting the liquid streams after introduction of the pod or capsules content therein is removable and disposable, such that the dispenser can be kept clean and hygienic during an extended period of time without extensive cleaning.

The connection between the pods and mixing means can be achieved by multiple existing connections such as a screw thread connection or a snap fit connection whereby the ingredient discharge of the pods connect the corresponding mixer fluid supply entries in a liquid tight manner.

The mixer outlet is preferably elongated in a tube protruding from the housing of the mixing means allowing direct dispensing from the outlet into a vessel.

The connection of the liquid lines extending from the base liquid source(s) to the pods or capsules is preferably achieved by intermediate of a valve provided on the pods or capsules liquid inlet, the valve being actuated by an actuator provided at the pod or capsules receiving means in the dispenser.

The method of preparing a beverage with a beverage dispenser according to the present invention is the same for both described embodiments. In both cases, one or more base liquid sources are coupled to the liquid inlets of the dispenser and a users selects two pods containing one or more ingredients of his/hers choice and provides these pods in the dispenser pod receiving means.

By subsequently activating the dispenser, the base liquid is fed through the liquid lines and through the pods, thereby discharging the beverage ingredients of both pods in the respective base liquid to obtain two liquid streams. These liquid streams flow through the jet mixer supply channels to the jet mixer discharges thereby creating two oppositely directed or impinged fluid streams that as a result are thoroughly mixed to obtain the desired beverage that is dispensed through the jet mixer outlet.

It is clear that when dispensing a malt based beverage and in particular a beer or mixture comprising beer, the dispensing temperature of the beer is preferably between 2 and 5° C. While the cooling capacity of the base liquid is limited due to potential freezing thereof, the volume content of the pods or capsules (which are usually provided in the dispensing device at room temperature or at a temperature of about 6-8° C. when stored in a fridge before use) should be kept as small as possible not to increase temperature of the base liquid.

As not all ingredients can be concentrated to a same degree, some ingredients will need to be loaded in a rather large volume that influences (increases) the temperature of the beverage upon mixing.

In order to prevent excessive heating of the beverage, the present invention also concerns a pod or capsule comprising a wall enclosing a pressurized chamber having a liquid inlet and a ingredient discharge, whereby the chamber contains a beverage ingredient and a pressurized gas stored therein. The gas is preferably selected from the group consisting of $CO_2$, $N_2$ or $N_2O$ and the pressure inside the ingredient chamber preferably ranges between 0.5 to 2 bar overpressure.

When the content of the above pod or capsule is discharged through a double jet mixer of the dispenser according to the present invention, whereby the pressure at the jet mixer discharge is kept at a pressure of 0.1 or 0.2 bar overpressure (due to fluid communication with the ambient at the beverage outlet of the dispenser at a short distance of about 1 to 100 cm) the pressurized gas expands and thereby retracts heat from the mixture such that a cooling effect on the beverage is achieved.

The amount of pressurized gas to be provided in the pod or capsule for obtaining a desired cooling is to be determined based on the volume ratio of base liquid over pod ingredient content as well as on the anticipated temperature of the pod content and base liquid at dispensing. Such calculation is within the reach of a person skilled in the art and will not be elaborated in further detail.

The present invention is by no means limited to a beverage dispenser 1 according to the invention and a method according to the invention for mixing two or more beverage ingredients, described as examples and illustrated in the drawings, but such a beverage dispenser 1 and such a method according to the invention can be realised in all kinds of variants, without departing from the scope of the invention.

The invention claimed is:

1. A beverage dispenser which comprises a housing comprising:
   a. a first liquid inlet (3) connected or connectable to a source (4) of a base liquid (5);
   b. a second liquid inlet (7) connected or connectable to the source (4) of a base liquid (5) or to a source of pressurized gas;
   c. at least one mixing means (16) for mixing one or more beverage ingredients therein;
   d. a first liquid line connecting the first liquid inlet (3) and the mixing means (16);

e. a second liquid line connecting the second liquid inlet (7) and the mixing means (16);

f. a first ingredient container (9a) containing a first beverage ingredient, the ingredient container provided in a first ingredient container receiving means (8a), configured such that upon providing a liquid stream in the first liquid line, the first beverage ingredient is discharged from the ingredient container (9a) into the liquid stream;

g. a second ingredient container (9b) containing a second beverage ingredient, the ingredient container provided in an ingredient container receiving means (8b), configured such that upon providing a liquid stream in the second liquid line, the second beverage ingredient is discharged from the ingredient container (9b) into the liquid stream; and h. a beverage outlet (13) in liquid communication with the mixing means (16);

the mixing means (16) comprises one or more double jet mixers (21, 22), comprising each at least a first jet mixer liquid supply entry (17) in liquid communication with the first liquid line and a second jet mixer liquid supply entry (18) in liquid communication with the second liquid line, a pair of jet mixer liquid flow channels (19, 20) having each a jet mixer discharge end for expelling liquids in mutually, oppositely directed or impinging jet streams (23, 24), so to mix the liquids into a liquid mixture, and a jet mixer outlet (25) through which the liquid mixture can leave the double jet mixer in liquid communication with the beverage outlet (13).

2. The beverage dispenser according to claim 1, wherein the mixing means (16) comprise a housing with a wall defining a mixing chamber, the first and second liquid supply entry (17, 18) and jet mixer flow lines (19, 20) are provided with the first and second jet mixer discharge ends (21, 22) provided at opposite sides of the mixing chamber and directed towards one another in the mixing chamber.

3. The beverage dispenser according to claim 2, wherein the mixing means (16) are removably secured in the beverage dispenser (1).

4. The beverage dispenser according to claim 3, wherein the mixing means (16) are manufactured in a plastic material.

5. The beverage dispenser according to claim 2, wherein the housing of the mixing means (16) comprises two ingredient container receiving docks (8a, 8b) and wherein the ingredient containers (9a, 9b) comprise connectors configured to mate with one of the receiving docks of the housing of the mixing means (16).

6. The beverage dispenser according to claim 4, wherein the pods (9a, 9b) comprise a discharge channel that upon connection of the ingredient container with the housing of the mixing means (16) liquidly connect to the corresponding liquid supply entry of the mixing means (16).

7. The beverage dispenser according to claim 3, wherein the housing of the mixing means comprises two ingredient container receiving docks and wherein the ingredient containers (9a, 9b) comprise connectors configured to mate with one of the receiving docks of the housing of the mixing means.

8. The beverage dispenser according to claim 7, wherein the pods comprise a discharge channel that upon connection of the ingredient container (9a, 9b) with the housing of the mixing means liquidly connect to the corresponding liquid supply entry of the mixing means.

* * * * *